United States Patent
Irie

(10) Patent No.: US 8,554,047 B2
(45) Date of Patent: Oct. 8, 2013

(54) COMPOSITE AUDIO-VIDEO APPARATUS

(75) Inventor: Toshiaki Irie, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 3396 days.

(21) Appl. No.: 10/705,336

(22) Filed: Nov. 10, 2003

(65) Prior Publication Data

US 2004/0114905 A1    Jun. 17, 2004

(30) Foreign Application Priority Data

Nov. 12, 2002    (JP) .............................. 2002-007164 U

(51) Int. Cl.
*H04N 5/775*    (2006.01)

(52) U.S. Cl.
USPC .......................................... 386/230; 386/354

(58) Field of Classification Search
USPC ............................................................. 386/46
See application file for complete search history.

(56) References Cited

U.S. PATENT DOCUMENTS

| | | | | |
|---|---|---|---|---|
| 6,400,280 B1 * | 6/2002 | Osakabe | ...................... | 340/4.41 |
| 6,789,208 B2 * | 9/2004 | Noda et al. | ..................... | 713/323 |
| 7,016,595 B1 * | 3/2006 | Ishino et al. | ..................... | 386/46 |
| 2004/0019914 A1 * | 1/2004 | Easterbrook et al. | ......... | 725/141 |
| 2005/0132410 A1 * | 6/2005 | Perlman | .......................... | 725/80 |

FOREIGN PATENT DOCUMENTS

JP    7488873    10/1995

* cited by examiner

*Primary Examiner* — Christopher S Kelley
*Assistant Examiner* — Christopher Findley
(74) *Attorney, Agent, or Firm* — Osha Liang LLP

(57) ABSTRACT

In a composite audio-video apparatus, when a user operates a remote controller and sends a DVD reproducing command, a remote control receiving section receives the DVD reproducing command and outputs it into a VCR control section and DVD control section. The DVD control section controls a DVD reproduce section to reproduce a DVD, and the DVD control section sends a direction signal to the VCR control section. When the VCR control section receives the direction signal, the VCR control section sends an image changeover signal to an image output section, and the image output section is set its image inputting source to the DVD reproduce section. The image reproduced by the DVD reproduce section is outputted to a television set via the image output section.

4 Claims, 2 Drawing Sheets

COMPOSITE AUDIO-VIDEO APPARATUS

BACKGROUND OF THE INVENTION

1. Field of the Invention

The present invention relates to a composite audio-video apparatus in which a plurality of reproduce sections for respectively reproducing different recording mediums such as DVDs and videocassettes, in which information is recorded according to different specifications, are integrated into one body.

2. Description of the Related Art

In general, a composite audio-video apparatus has an integrated mechanism including a DVD reproduce section and a videocassette reproduce section. Images recorded by a plurality of different recording systems are respectively reproduced by the respective reproduce sections and outputted.

The composite audio-video apparatus includes: a DVD reproduce section for reproducing image data recorded on DVD; a DVD control section for controlling the DVD reproduce section; a videocassette reproduce section for reproducing an image signal recorded on a videocassette; a VCR control section for controlling the videocassette reproduce section; an operating section (for example, a remote controller and a remote control signal receiving section) for outputting an operation command, which is given by a user, to the DVD control section and the VCR control section; and one image output section for outputting a reproduced image. Either an image reproduced by the DVD reproduce section or an image reproduced by the videocassette reproduce section is outputted to a display device such as a television set.

When the user sets a DVD in the DVD reproduce section and directs to reproduce the DVD by operating a DVD operation button of the remote controller, the DVD reproduce section reproduces image data recorded on the DVD and outputs the image data to the image output section. On the other hand, when the user sets a videocassette in the videocassette reproduce section and directs to reproduce the videocassette by operating a VCR operation button of the remote controller, the videocassette reproduce section reproduces image signal recorded on the videocassette and outputs the image signal to the image output section.

As described above, the composite audio-video apparatus includes a plurality of image reproduce sections. When the user operates the remote controller, a recording medium, which is set in the image reproduce section, is reproduced and outputted. In this way, a desired image can be provided by the composite audio-video apparatus as shown in, for example, JP-A-7-288873.

However, in the conventional composite audio-video apparatus in which the DVD reproduce section and the videocassette reproduce section are composite, when the apparatus is set in such a manner that an image is inputted from the videocassette reproduce section to the image output section and then outputted to the television set, an image of DVD is not outputted to the television set even if a DVD is set in the DVD reproduce section and DVD reproducing operation is conducted by the remote controller. That is, unless the image output section is set in such a manner that the image can be inputted from the DVD reproduce section to the image output section, the image of the DVD cannot be outputted to the television set. In this case, an image inputting source to the image output section need to be changed over from the videocassette reproduce section to the DVD reproduce section. In general, this changeover control function is provided in either the VCR control section or the DVD control section. In the case of the composite audio-video apparatus including a videocassette image record function, the changeover control function is usually provided in the VCR control section.

Therefore, when the user wants to view an image of a DVD in the above state, operation of changeover the image must be conducted together with operation of reproducing DVD. That is, when the user directs the VCR control section to change over the image by conducting operation of changeover the image with the remote controller, the VCR control section controls so that the image input source of the image output section is changed over from the VCR reproducing side to the DVD reproducing side. The image of the DVD can be then outputted to the television set and the user can view the image on TV.

As described above, in the conventional audio-video apparatus, not only the user must set a recording medium, which the user wants to view, in the apparatus and conduct reproducing operation, but also the user must change over the image so that the image obtained by reproducing the recording medium can be outputted. Thus, operation was troublesome.

In order to solve the above problems, it is possible to adopt the following method. The control means for controlling to change over the image (the VCR controlling section in the case of the above example) is provided with a function to analyze an operation command of the other control means (the DVD control section), and the changeover control is automatically conducted in the case of receiving the operation command of operating the DVD. However, it is difficult to put this method into practical use for the following reasons. The number of bits of data of the signal of the operation command of operating the DVD control section is different from that of the signal of the operation command of operating the VCR control section. Further, the timing of displaying "0, 1" (for example, the light emitting time in the case of remote control of infrared ray correspondence) of the DVD control section is quite different from that of the VCR control section. Therefore, it becomes necessary to analyze the operation commands of both the DVD control section and the VCR control section, which imposes a heavy load on the VCR control section (the microcomputer). Accordingly, this method is difficult to be practically realized. Since the types of these correspondence data have been registered, it is almost impossible to unify these two types of the operation commands into a single type of the operation command. For the above reasons, it is very difficult to make the control section (the VCR control section) of conducting the image changeover control analyze the operation command of the other control section (the DVD control section) so as to automatically change over the image.

SUMMARY OF THE INVENTION

Therefore, it is an object of the present invention to provide a composite audio-video apparatus capable of automatically changing over an image by a simple method without using the aforementioned conventional method.

In order to solve the above problems, the present invention is configured as follows.

A composite audio-video apparatus of the present invention comprises: first and second image reproduce sections for reproducing images respectively recorded in different mediums; first and second control sections for respectively controlling the first and the second image reproduce sections; an operation command informing section for informing the first and the second control section of an operation command inputted by a user; and an image output section for selectively outputting an image reproduced by the first or the second image reproduce section, wherein the second control section outputs a direction signal in the case where the operation command inputted from the operation command informing section is an operation command for the second image reproduce section, and the first control section controls to change over the image by the image outputting section when the direction signal is received.

In the above constitution, when a reproducing command is inputted into the second control section not capable of directly changing over the image of the image output section, the second image reproduce section reproduces an image recorded on a recording medium and outputs the image to the image output section, and the second control section outputs a direction signal composed of only "0, 1" showing that the image has been outputted from the second image reproduce section. When this direction signal is received by the first control section, the first control section changes over the image inputting source of the image output section from the first image reproduce section to the second image reproduce section, and the image output section outputs an image reproduced by the second image reproduce section to a display device such as a television set. Due to the above constitution, the image changeover control can be automatically conducted only by the direction signal of a simple type.

The first control section of the composite audio-video apparatus of the present invention may include a discrimination section for discriminating whether or not the operation command is a specific operation command which has been previously set for the first image reproduce section when the operation command for the first image reproduce section is inputted to the first control section, and only when the operation command is the specific operation command for the first image reproduce section, the first control section changes over the image output section so that an image from the first image reproduce section is outputted.

In this constitution, operation is conducted as follows. When an operation command to the first image reproduce section is inputted from the operation section into the first control section capable of changing over the image output section, it is judged whether or not this operation command is a specific operation command. In the case where it is the specific command (for example, it is the command of reproducing an image or it is the command of setting a function), the image inputting source of the image output section is changed over to the first image reproduce section. On the other hand, when it is not a specific operation command (for example, it is a command of not displaying an image, that is, it is a command of fast-forwaring, rewinding or skipping), the image inputting source of the image output section is not changed over to the first image reproduce section. Due to the above constitution, for example, even when the fast-forwarding operation, which is the operation of not viewing an image, is conducted by the first image reproduce section while an image is being reproduced by the second image reproduce section and outputted into the image output section, the image reproduced by the second image reproduce section is continuously outputted into the television set.

The second control section of the composite audio-video apparatus of the present invention may include a discrimination section for discriminating whether or not the operation command is a specific operation command which has been previously set for the second image reproduce section when the operation command for the second image reproduce section is inputted to the second control section, and only when the operation command is the specific operation command for the second image reproduce section, the direction command is outputted to the first control section.

In this constitution, operation is conducted as follows. When an operation command to the second image reproduce section is inputted from the operation section into the second control section incapable of controlling to change over the image output section, it is judged whether or not this operation command is a specific operation command which has been previously set. In the case where it is a specific operation command (for example, it is a command of reproducing an image or a command of setting a function), a direction signal is outputted into the first control section. On the other hand, in the case where it is not a specific operation signal (for example, it is a command of fast-forwarding, rewinding or skipping which is a command of not displaying an image), a direction signal is not outputted. Due to the above constitution, for example, even when the fast-forwarding operation, which is the operation of not viewing an image, is conducted by the second image reproduce section while an image is being reproduced by the first image reproduce section and outputted into the image output section, the image reproduced by the first image reproduce section is continuously outputted into the television set.

DETAILED DESCRIPTION OF THE PREFFERED EMBODIMENTS

Figure 1:
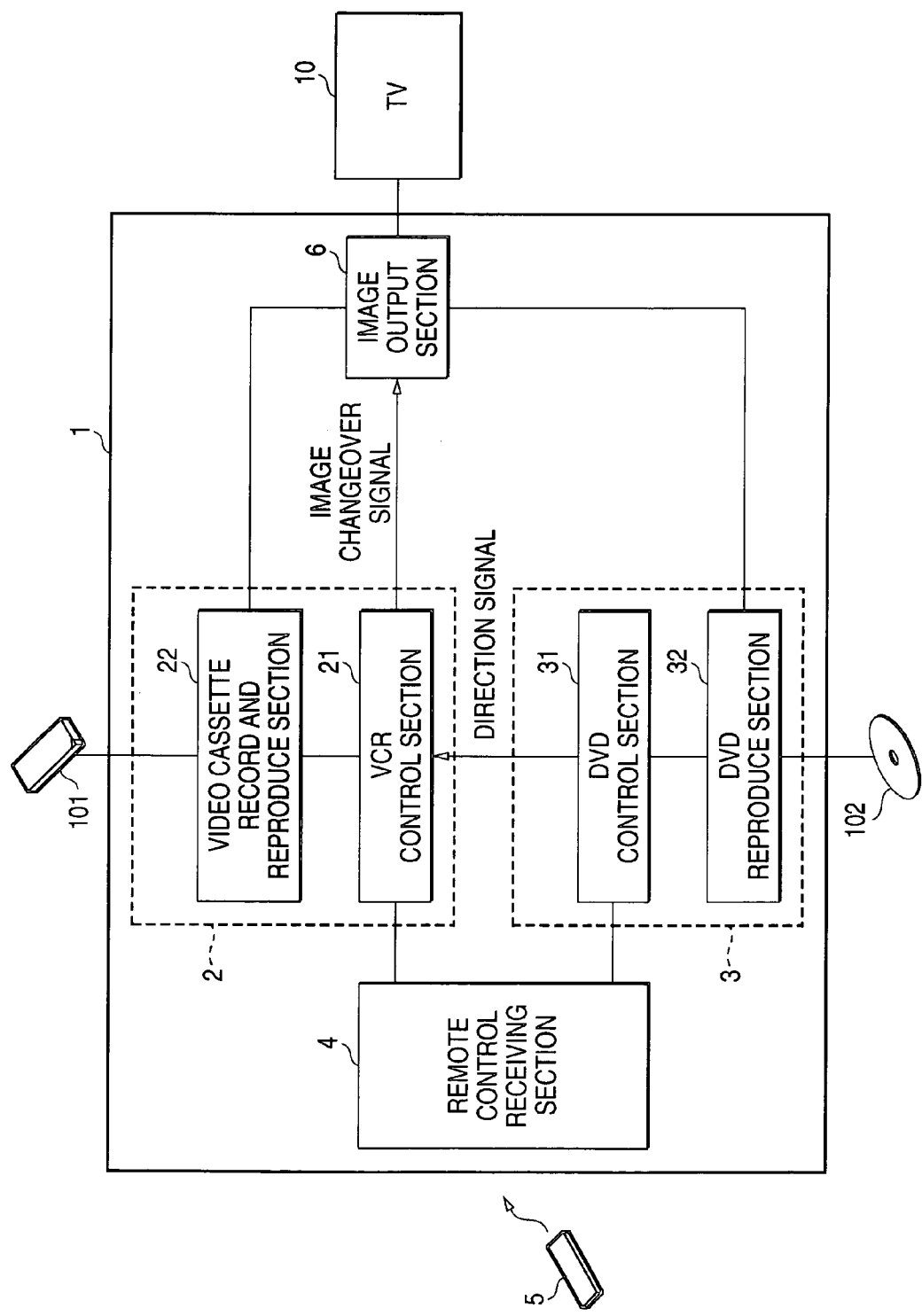
FIG. 1 is a block diagram showing an block diagram of a composite audio-video apparatus according to an embodiment of the present invention.

Referring to the drawings, a composite audio-video apparatus according to an embodiment of the present invention will be described below.

In this embodiment, explanations will be made into a composite audio-video apparatus having both a videocassette recording and reproducing function and a DVD reproducing function.

FIG. 1 is a block diagram showing a primary portion of the composite audio-video apparatus of this embodiment.

In FIG. 1, reference numeral 1 is a main body of the composite audio-video apparatus, reference numeral 2 is a VCR function section, reference numeral 3 is a DVD function section, reference numeral 4 is a remote control receiving section, reference numeral 5 is a remote controller, reference numeral 6 is an image output section, reference numeral 10 is a television set, reference numeral 101 is a video cassette, and reference numeral 102 is a DVD. The VCR function section 2 includes: a VCR control section 21 corresponding to a first control section of the present invention; and a videocassette record and reproduce section 22 corresponding to a first image reproduce section. The DVD function section 3 includes: a DVD control section 31 corresponding to a second control section of the present invention; and a DVD reproduce section 32 corresponding to a second image reproduce section. An operation command informing section of the present invention corresponds to the remote controller 5 and the remote control receiving section 4.

The video cassette record and reproduce section 22 reproduces an image recorded on the video cassette 101, which is set at a predetermined position of the apparatus body 1, and outputs the image into the image output section 6. The videocassette record and reproduce section 22 records an image signal, which is inputted from a tuner or an external inputting terminal not shown, on a magnetic recording medium (magnetic tape) of the videocassette. The videocassette record and reproduce section 22 is controlled by the VCR control section 21.

The VCR control section 21 receives an operation command for the videocassette record and reproduce section 22, which is inputted by a user when the user operates an operation button of the remote controller 5, via the remote control receiving section 4 and controls the videocassette record and reproduce section 22 according to this operation command so that image reproducing and image recording can be conducted. The VCR control section 21 has a function of controlling to change over the image output section 6, that is, the VCR control section 21 changes over an image inputting source of the image output section 6 between the videocassette record and reproduce section 21 and the DVD reproduce section 31.

The DVD reproduce section 32 reproduces an image recorded on the DVD 102, which is set at a predetermined position of the apparatus body 1, and outputs the image into the image output section 6. This DVD reproduce section 32 is controlled by the DVD control section 31.

When an operation command for the DVD reproduce section 32, which is received by the remote control receiving section 4, is inputted into the DVD control section 31, the DVD control section 31 controls the DVD reproduce section 32 according to this operation command so that the DVD reproduce section 32 can conduct reproduction. After the DVD control section 31 has inputted the operation command into the DVD reproduce section 32, the DVD control section 31 outputs a direction signal, which indicates that the thus inputted operation signal is an operation signal for the DVD reproduce section 32, into the VCR control section 21. This direction signal may be a simple binary signal of "0, 1". For example, this direction signal may be a signal, the state of which changes from 0 to 1 when the operation command for the DVD reproduce section 32 is inputted.

When the VCR control section 21 receives this direction signal from the DVD control section 31, the VCR control section 21 controls the image output section 6 so that the image inputting source can be changed over to the DVD reproduce section 32.

Next, a flow of changing over the image output will be described referring to FIG. 2.

Figure 2:
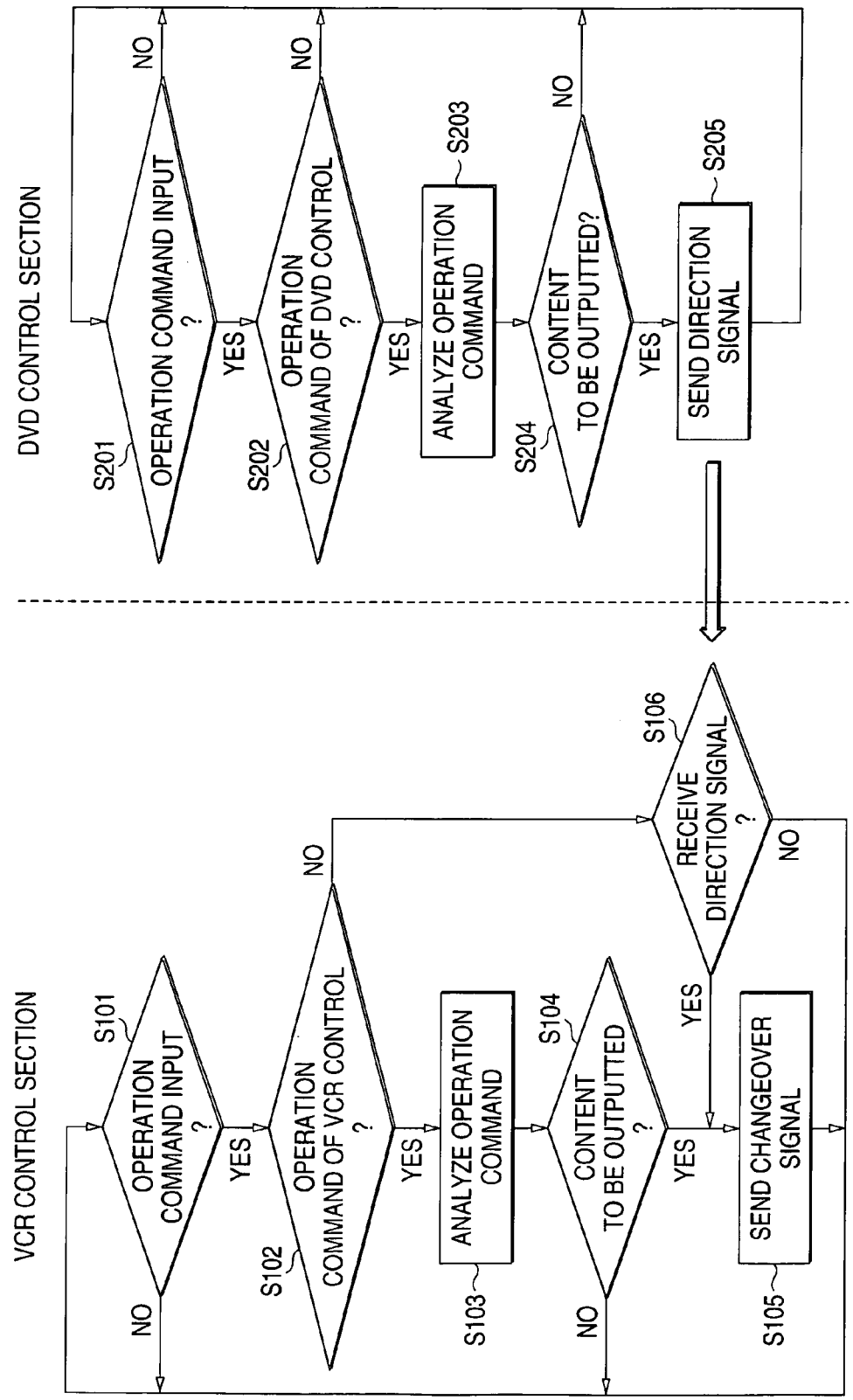
FIG. 2 is a flow chart showing a flow of each control section shown in FIG. 1.

FIG. 2 is a flow chart showing a flow from the input of an operation command to changeover of an image output. In FIG. 2, flows of the VCR control section 21 and the DVD control section 31 are shown.

(1) Reproduction at VCR

When a user pushes the button of the remote controller 5 so as to input operation for the VCR function, the remote controller 5 generates a predetermined type operation command and sends the command to the remote control receiving section 4 with infrared rays. When the remote control receiving section 4 receives the operation command, the operation command is converted into a predetermined form and outputted into the VCR control section 21 and the DVD control section 31.

When the VCR control section 21 receives the operation command from the remote control receiving section 4, the VCR control section 21 discriminates the data type of the operation command, that is, the VCR control section 21 discriminates whether or not this operation command is an operation command for the VCR control (S101 to S102). In the case where this operation command is a command for the VCR control, the operation command is analyzed and the videocassette record and reproduce section 22 is controlled by the VCR control section (S103). The VCR control section 21 discriminates whether or not it is necessary to output the result, which is obtained when the videocassette record and reproduce section 22 has realized the thus analyzed operation command, to the television set. When it is necessary to output the result to the television set, an image changeover signal is sent to the image output section 6 (S104 to S105) and the VCR control section controls so that the image inputting source becomes the videocassette record and reproduce section 22. On the other hand, in the case of an operation command not requiring to display the result, the image changeover signal is not sent and the apparatus waits for the input of the next operation command (S104 to S101).

In this case, whether or not it is necessary to output (display) the result of execution of the operation command has previously been set, that is, whether or not it is a specific operation command has previously been set. The relation between the operation command and the necessity of display is stored in the VCR control section 21. The relation is defined as follows. For example, in the case of a reproducing command, it is necessary to display so that a user can view it. Therefore, this case is related to the need for display. In the case of a fast-forwarding or rewinding operation of a video tape, it is unnecessary to display on the display. Therefore, this case is related to the needlessness of display.

On the other hand, when the DVD control section 31 receives an operation command from the remote control receiving section 4, the type of data is discriminated, and it is discriminated whether or not this operation command is an operation command of the DVD control (S201 to S202). In this case, since the operation command is not a command of the DVD control, the DVD control section waits for receiving a command until the next operation command is received (S202 to S201).

In the same manner as that of the VCR control section 21 described before, in the case of the DVD control section 31, the relation between the operation command and the need for display has previously been stored.

(2) Reproduction of DVD

When the DVD control section 31 receives an operation command from the remote control receiving section 4, the DVD control section 31 discriminates the data type of the operation command, that is, the DVD control section 31 discriminates whether or not this operation command is an operation command for the DVD control (S201 to S202). In the case where this operation command is a command for the DVD control, the operation command is analyzed and the DVD reproduce section 32 is controlled (S203). The DVD control section 31 discriminates whether or not it is necessary to output the result, which is obtained when the DVD reproduce section 32 has realized the thus analyzed operation command, to the television set. When it is necessary to output the result to the television set, the aforementioned direction signal is sent to the VCR control section 21 (S204 to S205). When the VCR control section 21 receives the direction signal (S106), the VCR control section 21 sends a changeover signal to the image output section 6 (S105) to control so that the image inputting source becomes the DVD reproduce section 32. On the other hand, in the case of an operation command not requiring to display the result, the direction signal is not sent and the apparatus waits for the input of the next operation command (S204 to S201).

Due to the above constitution, even when the image output section 6 receives an image from either the videocassette record and reproduce section 22 or the DVD reproduce section 32, as long as the remote controller 5 conducts the reproducing operation of either the videocassette record and reproduce section 22 or the DVD reproduce section 32, the image changeover can be automatically conducted so that an image from the reproduce section can be received by the image output section 6.

Due to the foregoing, when the user sets a recording medium (videocassette or DVD), on which a desired image is stored, in the apparatus body and conducts the reproducing operation without changing over the image, it is possible for the user to view the desired image.

When the image is changed over only by sending and receiving the direction signal without making each control section analyze a plurality of data types of operation commands, it becomes unnecessary to analyze the operation command signal of the opponent control section. Therefore, each control section can be composed of a simple structure.

Since the image changeover can be conducted only when an operation command required to be displayed is inputted, for example, in the case of a composite audio-video apparatus in which VCR and DVD reproduce function are composite with each other, even when a video tape is fast-forwarded or rewound in the video cassette reproduce section while DVD is being reproduced in the DVD reproduce section, there is no possibility that the output of DVD is changed over to the output of VCR. Therefore the user can continuously view the image without being suddenly interrupted.

In this embodiment, explanations are made into the composite audio-video apparatus in which DVD and VCR are composite with each other. However, it should be noted that the present invention can be applied to a composite audio-video apparatus having a plurality of reproduce sections for reproducing the other recording mediums such as an optical disk, DV, hard disk (magnetic memory disk) and the like.

In this embodiment, the inputting of operation is conducted by means of remote control. However, image changeover can be automatically conducted in the same manner in the case of conducting the inputting operation with the operation keys provided in the apparatus body.

As was described above, according to the composite audio-video apparatus of the present invention, the following advantages can be provided. When an operation command for the second control section having no control function of controlling the image output section is inputted by the operation key of the apparatus body or the remote controller, the second control section having no control function of controlling the image output section outputs a direction signal into the first control section having a control function of controlling the image output section, and this first control section conducts control of changing over the image. Due to the foregoing, when the user sets a desired image recording medium in the apparatus body and conducts the reproducing operation, it is possible for the user to view the desired image without changing over the image.

Since image changeover can be conducted only by the direction signal, it becomes unnecessary to provide a function of decoding the operation command of the opponent the control section of the first or the second control section. Accordingly, it is possible to automatically change over an image by the control section of a simple structure.

According to the composite audio-video apparatus of the present invention, even when an operation not requiring to view an image such as a fast-forward operation is conducted in the other image reproduce section while one image reproduce section is reproducing an image and outputting it into the image output section, the image which is being reproduced is continuously outputted into the television set. Therefore the user can continuously view the image without being suddenly interrupted.

What is claimed is:

1. A composite audio-video apparatus comprising:
   first and second image reproduce sections for reproducing images respectively recorded in different mediums;
   first and second control sections for respectively controlling the first and the second image reproduce section; an operation command informing section, including a remote operating section, for informing the first and the second control section of an inputted operation command; and
   an image output section for selectively outputting an image reproduced by the first or the second image reproduce section;
   wherein the first control section includes a changeover control section for controlling to change over an image input source of the image output section;
   the second control section outputs a direction signal to the first control section only when the operating command inputted from the operation command informing section is a specific operation command which has been previously set for the second image reproduce section; and
   the first control section changes over the image output section so that an image reproduced by the second image reproduce section is outputted in the case where the first control section receives the direction signal even when the image output section is set to output an image reproduced by the first image reproduce section, and the first control section changes over the image output section so that the image reproduced by the first image reproduce section is outputted in the case where the operation command inputted from the operation command informing section is a specific operation command which has been previously set for the first image reproduce section.

2. A composite audio-video apparatus comprising:
   first and second image reproduce sections for reproducing images respectively recorded in different mediums;
   first and second control sections for respectively controlling the first and the second image reproduce sections;
   an operation command informing section for informing the first and the second control sections of an inputted operation command; and
   an image output section for selectively outputting an image reproduced by the first or the second image reproduce section;
   wherein the first control section includes a changeover control section for controlling to change over an image input source of the image output section;
   the second control section outputs a direction signal to the first control section when the operating command inputted from the operation command informing section is an operation command for the second image reproduce section; and
   the first control section changes over the image output section so that an image reproduced by the second image reproduce section is outputted in the case where the first control section receives the direction signal even when the image output section is set to output an image reproduced by the first image reproduce section, and the first control section changes over the image output section so that the image reproduced by the first image reproduce section is outputted in the case where the operation command inputted from the operation command informing section is an operation command for the first image reproduce section.

3. The composite audio-video apparatus according to claim 2, wherein the first control section includes a discrimination section for discriminating whether or not the operation command is a specific operation command which has been previously set for the first image reproduce section when the operation command for the first image reproduce section is inputted to the first control section; and only when the operation command is the specific operation command for the first image reproduce section, the first control section changes over the image output section so that an image from the first image reproduce section is outputted.

4. The composite audio-video apparatus according to claim 2, wherein the second control section includes a discrimination section for discriminating whether or not the operation command is a specific operation command which has been previously set for the second image reproduce section when the operation command for the second image reproduce section is inputted to the second control section; and only when the operation command is the specific operation command for the second image reproduce section, the direction command is outputted to the first control section.

* * * * *